United States Patent
Kanala et al.

(10) Patent No.: US 11,704,616 B2
(45) Date of Patent: Jul. 18, 2023

(54) SYSTEMS AND METHODS FOR DISTRIBUTED BUSINESS PROCESS MANAGEMENT

(71) Applicant: JPMORGAN CHASE BANK, N.A., New York, NY (US)

(72) Inventors: Sudhir Kanala, Sugar Land, TX (US); Ulku Rowe, New York, NY (US); Agim Perolli, Carmel, NY (US); Raymond Stephens, New York, NY (US); Stefan Vachev, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/646,775

(22) Filed: Jan. 3, 2022

(65) Prior Publication Data

US 2022/0129809 A1 Apr. 28, 2022

Related U.S. Application Data

(62) Division of application No. 16/033,110, filed on Jul. 11, 2018, now Pat. No. 11,216,764.

(60) Provisional application No. 62/531,173, filed on Jul. 11, 2017.

(51) Int. Cl.
| | |
|---|---|
| *G06Q 10/00* | (2023.01) |
| *G06F 9/00* | (2006.01) |
| *G06Q 10/0637* | (2023.01) |
| *G06F 9/22* | (2006.01) |
| *G06F 9/54* | (2006.01) |
| *G06Q 10/0633* | (2023.01) |

(52) U.S. Cl.
CPC ........ *G06Q 10/0637* (2013.01); *G06F 9/223* (2013.01); *G06F 9/542* (2013.01); *G06Q 10/0633* (2013.01)

(58) Field of Classification Search
CPC .......................................... G06Q 10/00–50/00
USPC ....................................................... 705/7.36
See application file for complete search history.

(56) References Cited

U.S. PATENT DOCUMENTS

| | | | |
|---|---|---|---|
| 7,693,731 B1 * | 4/2010 | Weber .................... | G06Q 40/08 705/4 |
| 10,853,796 B1 * | 12/2020 | Nolte .................... | G06Q 20/327 |
| 2006/0136279 A1 * | 6/2006 | Maybee ........... | G06Q 10/06316 705/7.26 |

(Continued)

*Primary Examiner* — Mustafa Iqbal
(74) *Attorney, Agent, or Firm* — Greenberg Traurig LLP

(57) ABSTRACT

Systems and methods for distributed business process management are disclosed. In one embodiment, in an information processing apparatus comprising at least one computer processor, a method for configuration-driven distributed orchestration using different software components to execute a complex business process may include: (1) receiving a request for a runtime flow from a flow management adapter; (2) reading a flow configuration from the request; (3) creating an instance of the runtime flow; (4) initiating a service call to each component in the runtime flow; (5) creating a runtime instance in a database along with a state of each dependency in the runtime flow; and in response to external dependencies being met: (6) building and sending message to the components using a message builder; (7) initiating flow actions via an event-driven scheduler; and (8) making a service call to at least one of the components using the message builders.

20 Claims, 9 Drawing Sheets

(56) References Cited

U.S. PATENT DOCUMENTS

| | | | |
|---|---|---|---|
| 2013/0013370 A1* | 1/2013 | Mithal | G06Q 10/06 705/7.27 |
| 2013/0283291 A1 | 10/2013 | Balko et al. | |
| 2013/0317847 A1* | 11/2013 | Yui | G16H 70/60 705/2 |
| 2014/0040386 A1* | 2/2014 | Somani | G06Q 50/01 709/206 |
| 2014/0258983 A1 | 9/2014 | Inamdar et al. | |
| 2015/0121378 A1* | 4/2015 | Whyte | G06F 9/448 718/100 |
| 2015/0128110 A1* | 5/2015 | Falk | G06F 11/3636 717/128 |
| 2016/0098661 A1 | 4/2016 | Viswanathan et al. | |
| 2016/0246809 A1 | 8/2016 | Romano et al. | |
| 2016/0292154 A1 | 10/2016 | Campbell et al. | |
| 2017/0315789 A1* | 11/2017 | Lam | G06F 3/04847 |
| 2017/0337492 A1* | 11/2017 | Chen | G06Q 10/0633 |
| 2018/0189344 A1 | 7/2018 | Akwule et al. | |

\* cited by examiner

SYSTEMS AND METHODS FOR DISTRIBUTED BUSINESS PROCESSMANAGEMENT

RELATED APPLICATIONS

This application is a Divisional of U.S. patent application Ser. No. 16/033,110, filed Jul. 11, 2018, now U.S. patent Ser. No. 11,216,764, which claims priority to U.S. Provisional Patent Application Ser. No. 62/531,173, filed Jul. 11, 2017, the disclosures of each of which is hereby incorporated, by reference, in its entirety.

BACKGROUND OF THE INVENTION

1. Field of the Invention

The present invention generally relates to systems and methods for distributed business process management.

2. Description of the Related Art

Business process management, or "BPM," is the approach to making an organization's workflow more effective, more efficient and more adaptable. BPM may manage the organizations end-to-end processes to achieve efficient management of complex process flows.

SUMMARY OF THE INVENTION

Systems and methods for distributed business process management are disclosed. In one embodiment, in an information processing apparatus comprising at least one computer processor, a method for configuration-driven distributed orchestration using different software components to execute a complex business process may include: (1) receiving a request for a runtime flow from a flow management adapter; (2) reading a flow configuration from the request; (3) creating an instance of the runtime flow; (4) initiating a service call to each component in the runtime flow; (5) creating a runtime instance in a database along with a state of each dependency in the runtime flow; and in response to external dependencies being met: (6) building and sending message to the components using a message builder; (7) initiating flow actions via an event-driven scheduler; and (8) making a service call to at least one of the components using the message builders.

In one embodiment, the request for the runtime flow may be from an external scheduler. The external scheduler may include an autosys job, a control m, and/or a custom scheduler.

In one embodiment, the request for the runtime flow may be a REST/Web Service call, a database entry, a Java messaging service, etc.

In one embodiment, the event-driven scheduler may include a CPS adapter that triggers flows based on a completion of a Context/Data Set event.

In one embodiment, the software components may include one or more micro services.

According to another embodiment, in an information processing apparatus comprising at least one computer processor, a method for configuration-driven distributed orchestration using different software components to execute a complex business process may include: (1) identifying a plurality of steps in a process flow that are waiting for dependencies to clear before they can execute; (2) identifying an optimal set of steps from the plurality of steps to be evaluated; (3) evaluating the optimal set of steps to determine a run order for the optimal set of steps; and (4) executing the optimal set of process steps in the run order after the dependencies for the steps in the optimal set of process flows have cleared.

In one embodiment, a state transition machine may determine that the dependencies are met.

In one embodiment, executing the steps may include sending a message to a component.

In one embodiment, the component may include a micro service.

In one embodiment, the method may further include changing a state for an executing step.

In one embodiment, the optimal set of process steps may be determined by an algorithm.

In one embodiment, the method may further include restarting the execution of the optimal set of steps from a point of failure.

According to one embodiment, the method may include automatically notifying the orchestration engine of a changing status of a dependency/context via CPS event publisher In embodiments, a self-orchestrating multi-step business flow may use dependency definitions for each individual micro-service configured in order to automatically determine optimal critical path and maximum degree of parallelism when orchestrating business flows consisting of hundreds of steps. In embodiments, a change to dependency configuration may automatically re-organize the flow event sequencing.

Embodiments may provide the ability to restart from any point of failure in a complex flow, failures only affect immediate critical path but do not affect independent parallel paths.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to systems and methods for distributed business process management.

According to embodiments, the system and method may manage "process flows" as independent and isolated units (e.g., co-ordination between flows is isolated to several components of the engine). Independent flows make the system stateless and hence very scalable.

In one embodiment, the core engine may be a messaging solution that increases resiliency.

Embodiments may enable automated job control system for scheduling, monitoring, and reporting to make service calls to components directly without the overhead of a "full-fledged workflow engine." Embodiments may also enable components to discover contexts (e.g., a set of one or more data objects identified by a common key; a business or system process event that may mark the creation and/or modification of one or more data objects, identified by a common key) as they become available instead of having to poll or be part of a Process Flow Control ("PFC"); may enable autosys jobs (and also more complex process flows) to be triggered on context availability instead of having to be part of a PFC and receive messages; may include a workflow engine type of services for complex use cases using a light-weight, extensible architecture (e.g., per-supply/perpetual processing (Anchor, Facility Mapping ("FacMap"), etc.)); iterating over scenarios (BASEL, STRESS, etc.); may enable components teams to be independent and own the flows (e.g., they may define, deploy, maintain, and even extend by themselves); may enable APIs to allow tools to be developed easily by other teams; may operate using middle office tools for controlling the flow (started, stopping, suspending supplies, etc.). In one embodiment, the system and method may be event-driven architectures that may increase efficiency and minimize resource utilization when compared to polling-based solutions.

Figure 1:
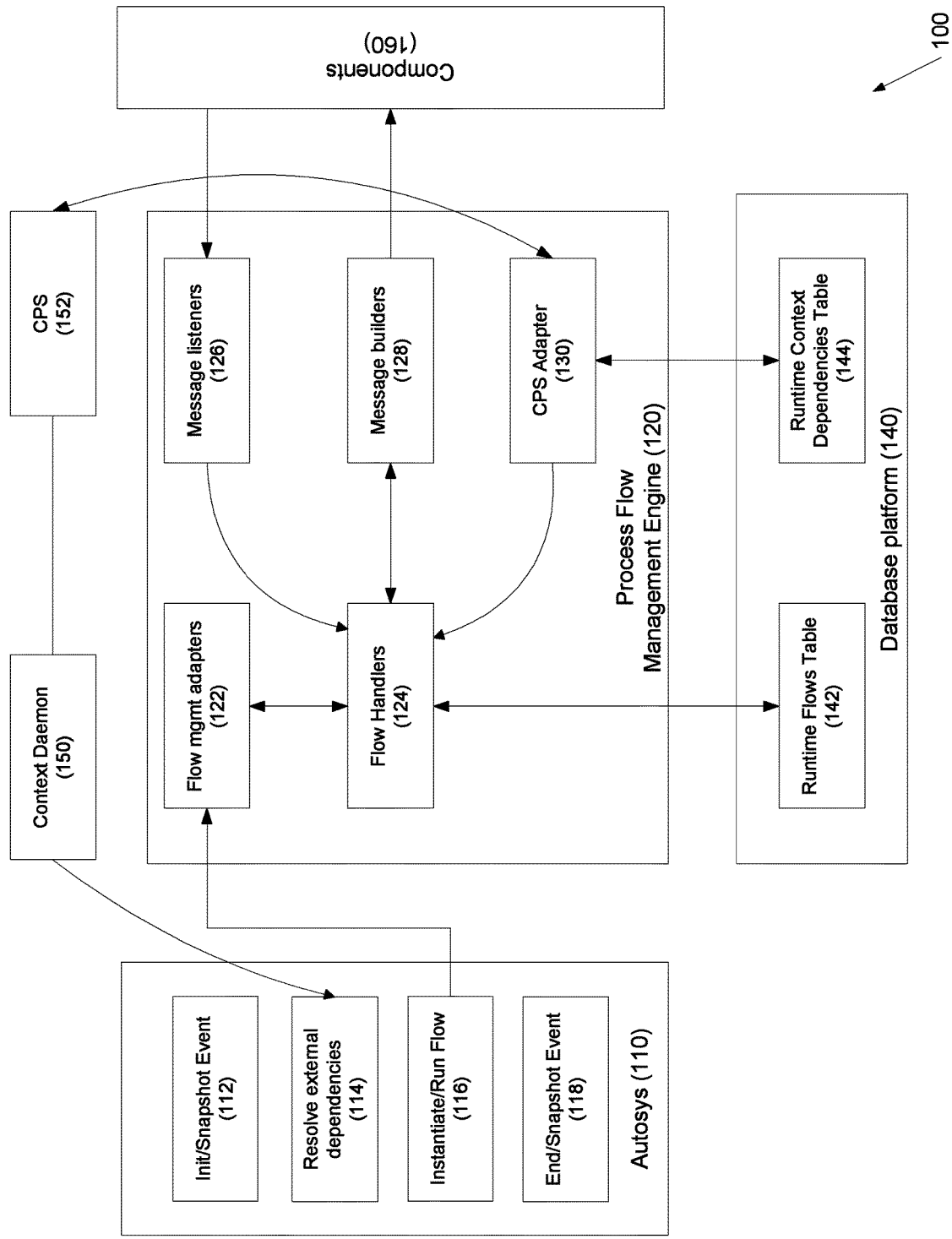
FIG. 1 depicts a system for distributed business process management according to one embodiment.

Referring to FIG. 1, a diagram of a system for distributed business process management according to one embodiment is disclosed. System 100 may include, for example, autosys 110, Process Flow Management Engine 120, database platform 140 (e.g., MongoDB), context daemon 150 and Context Publishing Service ("CPS") 152.

Autosys job 110 may include a process such as init/snapshot event 112, resolve external dependencies 114, instantiate/run flow 116, and end/snapshot event 118.

In one embodiment, autosys jobs may be enabled to make service calls to components directly.

Process Flow Management Engine 120 may provide services for complex use cases using a light-weight, extensible architecture, such per-supply/perpetual processing (e.g., Anchor, Facility Mapping, etc.), iterating over scenarios (e.g., BASEL, STRESS, etc.), etc. In one embodiment, the architecture may be event-driven, and may provide maximum efficiency and minimum resource utilization. This is in contrast to polling-based solutions.

In one embodiment, Process Flow Management Engine 120 may include flow management adapters 122, flow handlers 124, message listeners 126, message builders 128, and CPS adapters 130. In one embodiment, flow management adapters 122 may provide an interface for external systems to manage process flows. In one embodiment, flow management adapters 122 may support REST, WS, interfaces, straight inprocess library calls, etc. Flow management adapters 122 may allow external systems to perform some or all of the following: create/instantiate/run, stop/suspend/cancel, cut snapshot for a flow, raise worklist item for the flow, etc.

In one embodiment, process flow management engine 120 may interface with one or more component 160 via message listeners 126 and message builders 128. In one embodiment, components 160 may include micro services, computer programs, computer applications, etc. In one embodiment, one component may be dependent on another component; for example, the input of one component may be the output of another component.

In a financial environment, examples of components 160 that may be managed include Risk Exposure Calculators, Exposure Aggregators, Credit Risk Limits Monitoring, Internal Reporting Data Marts population, Regulatory Report Generation, etc. It should be recognized that these programs and/or applications are illustrative only and other programs and/or applications may be included as is necessary and/or desired.

In one embodiment, flow handlers 124 may manage flows within process flow management engine 120. In one embodiment, flow handlers 124 may create an instance of the flow, update flow state, initiate service calls to components, etc. Flow handlers 124 may use the configuration information to create an instance. Flow instantiation may create an entry in database platform 140 for that flow along with its dependencies' state.

Flow handlers 124 may include atomic flow handlers, composite flow handlers, perpetual flow handlers, etc. For example, an atomic flow, or a step, may be a single step that includes a single component (e.g., micro service) call. A composite flow may comprise a logical grouping of atomic and/or composite flows. In one embodiment, synchronization of dependencies (e.g., across multiple atomic flows) may be part of this process flow. Within this, a runnable composite flow may represent the highest grouping. In one embodiment, only runnable composite flows are scheduled to be run, while other composite flows are logic groupings of other flows.

A perpetual flow may be a process flow that is triggered on a per-supply basis. For example, the availability of input data (e.g., supply instances) may trigger the creation of a new flow. In one embodiment, a perpetual process flow may be constantly running, and checking for supply instances. The COB (close of business) date associated with the flow changes on "snapshot events."

In one embodiment, one or more flow configuration templates may be used. For example, a flow configuration template may specify the input context and dependencies consumed, the output context produced, and the target micro service that the system should invoke via the appropriate interface (e.g., messaging direct call, etc.). Flow templates may, for example, be static representation of the process flows. A runtime instance of the flow may be created when the process flow "runs". The run time instance may include the runtime data (COB date, process run type, etc.) along with the static data. Any other data may be provided as is necessary and/or desired.

Flow templates may be maintained in relational databases, such as Groovy, and the runtime instances may be stored in database tables, such as Oracle database tables. In one embodiment, a Groovy configuration may be different from a static configuration in that a Groovy configuration may make the while flow configuration very powerful, and complex logic may be embedded within configuration.

In one embodiment, an atomic flow handler may be used to create, manage atomic flow state, and initiate a service call to one or more components. Composite flow handlers may be used to create and manage composite flows state, add child atomic flows that belong to the composite flow. Perpetual flow handlers may be used when a runtime instance of perpetual flow or per-supply flow is created (e.g., when triggered by an autosys job) as it will not have any associated composite flows. In one embodiment, it may be an "empty" perpetual flow with no children (since there are no feeds/supplies yet).

In one embodiment, flow handlers 124 may be registered with CPS 152 via CPS adapter 130.

CPS 152 may enable components 160 to discover contexts as they become available, instead of having to poll or be part of a PFC. CPS 152 may publish messages to a topic when a new context is created.

In one embodiment, context daemon 150 may enable autosys jobs (and also more complex flows) to be triggered based on context availability instead of having to be part of a PFC and receive messages.

In one embodiment, component teams may be enabled to be independent and own the flows—define, deploy, maintain and even extend by themselves.

In one embodiment, APIs may be enabled to allow tools to be developed easily by other teams.

In one embodiment, middle office tools may be developed using context management. For example, tools, such as the API managing of contexts and flow management APIs for controlling the flow (started, stopping, suspending supplies, etc.) may be used.

In one embodiment, one or more component 160 may access any of the contexts and perform the necessary processing upon their availability. This may enable components 160 to perform, for example, caching, pre-fetching activities, etc. efficiently.

Figure 2:
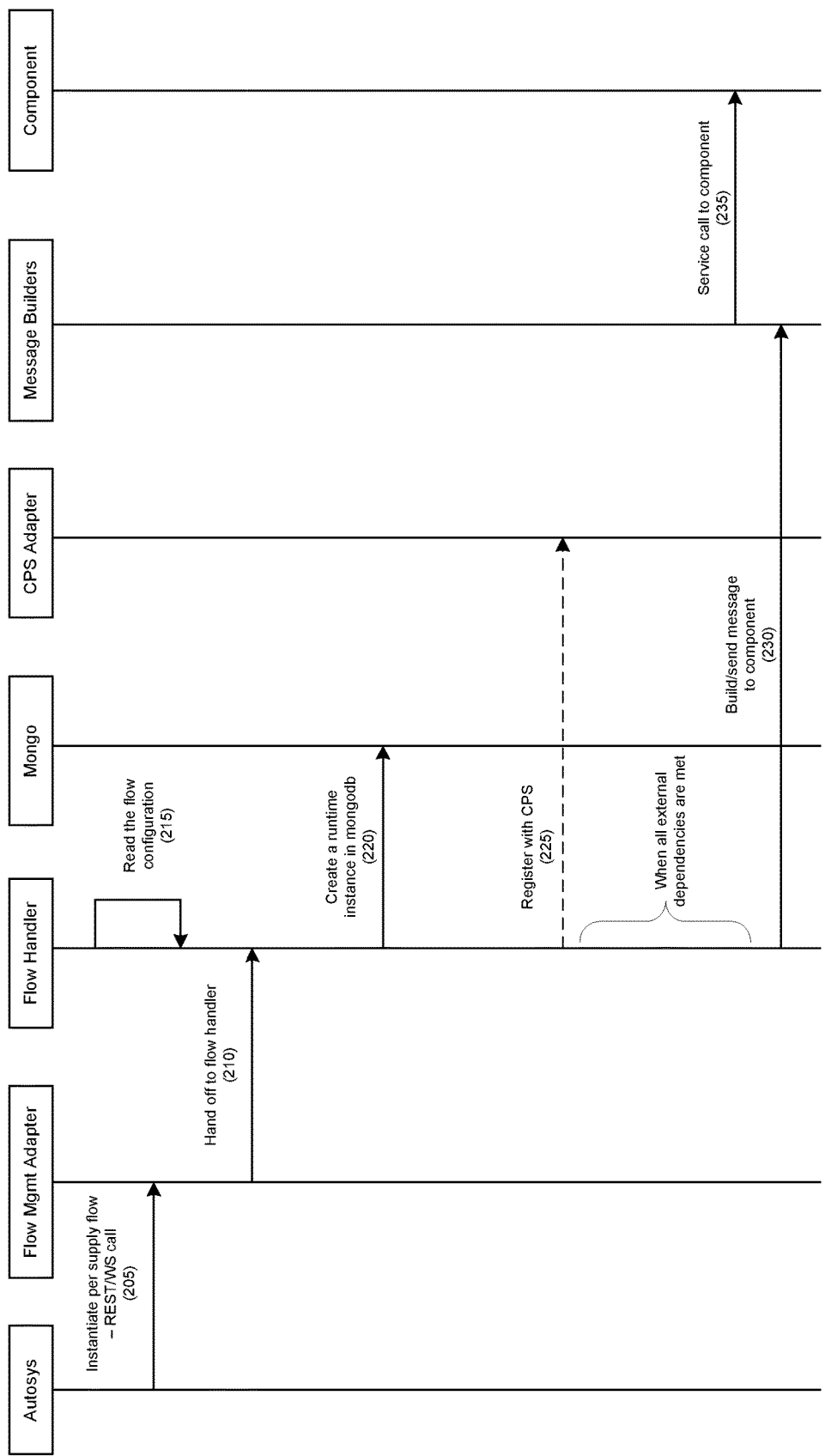
FIG. 2 depicts an exemplary sequence diagram of a flow run time instantiation according to one embodiment.

Referring to FIG. 2, an exemplary sequence diagram of a flow run time instantiation is provided according to one embodiment.

In step 205, an autosys job may instantiate a request for a runtime flow, such as per-supply/perpetual, a composite flow, etc., to a flow management adapter. In one embodiment, this may be a REST/Web Service call, Java Messaging Service (JMS), etc.

For example, an autosys job may use flow management adapters to send a request to the process flow management engine to instantiate a runtime flow, either per-supply/perpetual, composite flows, etc.

In step 210, the flow management adapter may pass the request to the flow handler. In one embodiment, the flow handler may read the flow configuration.

In one embodiment, in step 215, the flow management adapter may create an instance of the flow, update flow state, initiate service calls to components, etc.

In step 220, the flow handler may create a runtime instance in MongoDB along with its dependencies' states.

In step 225, the flow handler may be registered with CPS using the CPS adapter.

For example, when a context arrives, the CPS adapter may determine whether the context belongs to a perpetual flow and may pass the request to the perpetual flow handler. The perpetual flow handler may create a composite flow for that feed and may add it as a child to the perpetual flow. Each composite flow (which may be per supply feed) may be associated with one or more atomic flow (e.g., Anchor, FacMap, TradeStatus).

The CPS adapter may initiate the first atomic flow (e.g., Anchor) of that feed (e.g., composite flow).

In step 230, when external dependencies are met, the flow handler may build and send a message to the component using, for example, message builders. In one embodiment, if all the external contexts are met, in step 235, a service call may be sent to component. When the component responds, a message listener may update the result context of the first atomic flow (e.g., a first feed).

In one embodiment, the CPS adapter may also receive the result context and may perform similar actions. For example, the CPS adapter may further trigger a second atomic flow (e.g., FacMap) and may send a service call to a FacMap component.

In one embodiment, flow actions (e.g., service calls, flow state updates, etc.) may be initiated by the CPS adapter and/or component response message. In one embodiment, the system may not wait, or keep checking for context.

Figure 3:
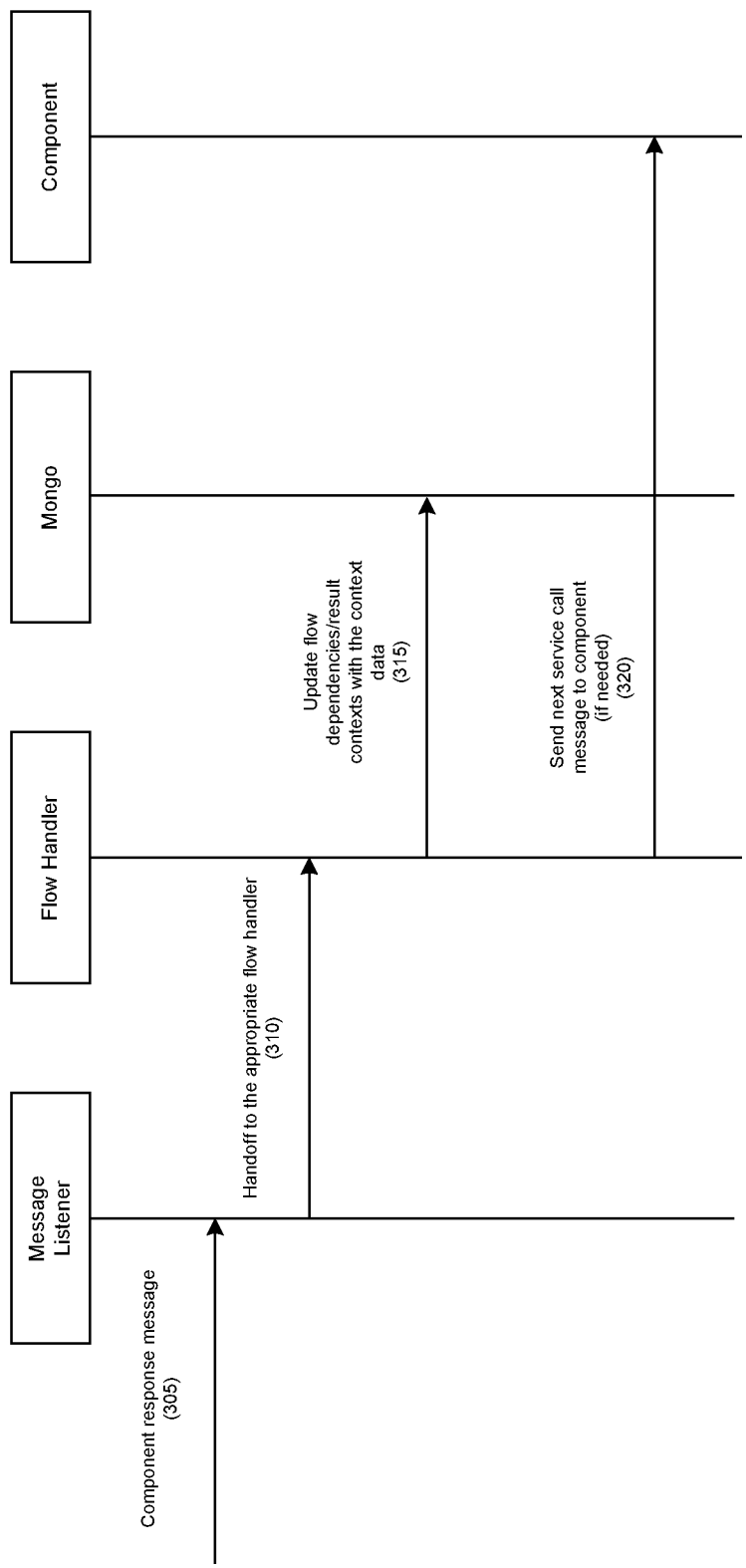
FIG. 3 depicts an exemplary sequence diagram of a flow progress response according to one embodiment.

Referring to FIG. 3, an exemplary sequence diagram of a flow progress response according to one embodiment is provided. In step 305, a message listener may receive a component response message.

In step 310, the message listener may pass the component response message an appropriate flow handler.

In step 315, the appropriate flow handler may update the flow dependencies and/or the result context with data received in the component response message. In one embodiment, this may be updated in a database platform, such as MongoDB.

In step 320, the flow handler may send a service call to a component if necessary.

Figure 4:
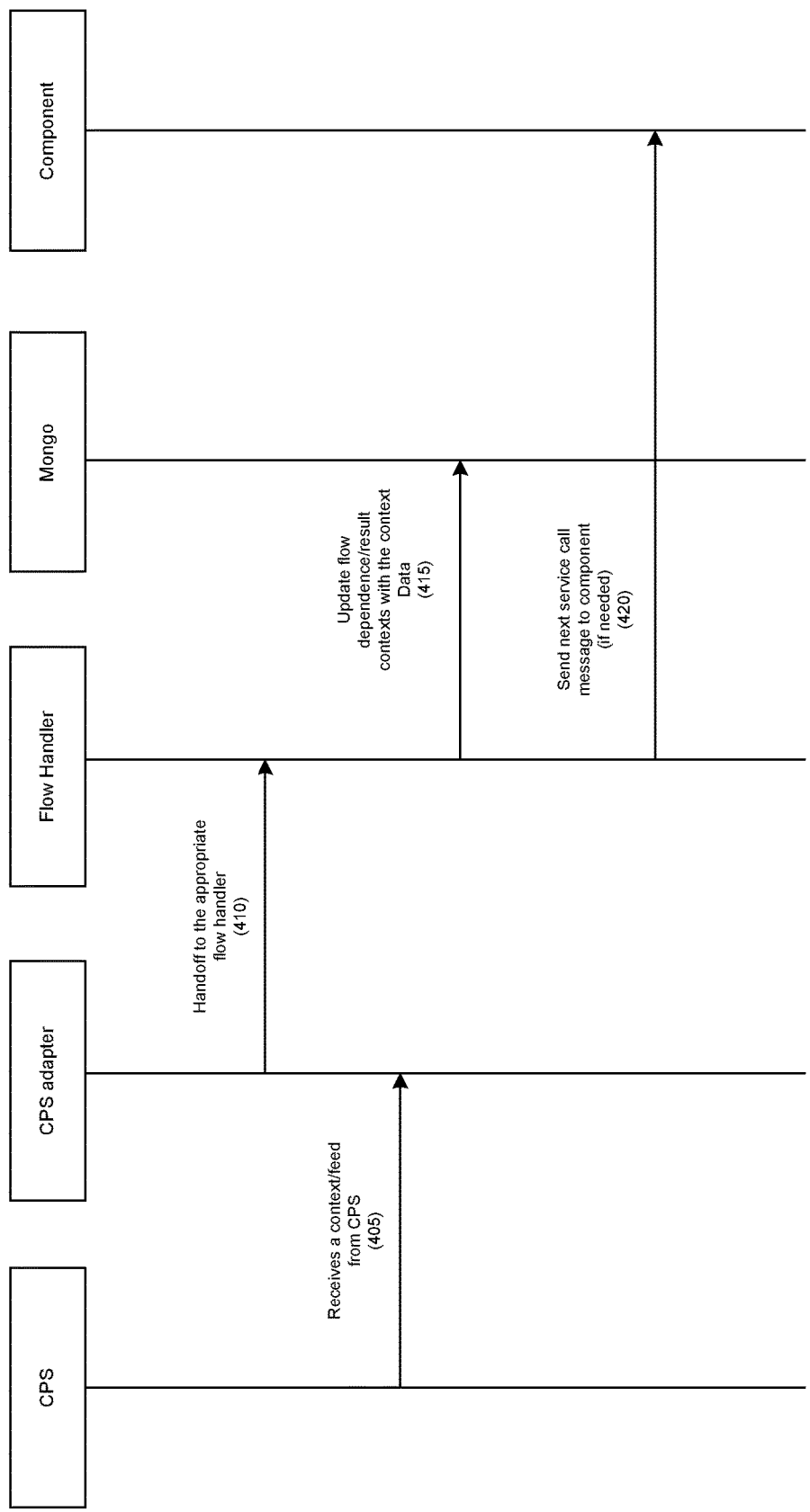
FIG. 4 depicts an exemplary sequence diagram of a flow progress based on results context according to one embodiment.

Referring to FIG. 4, an exemplary sequence diagram of a flow progress based on results context according to one embodiment is provided.

In step 405, the CPS adapter may receive a context/feed from CPS.

In step 410, the CPS adapter may pass the context/feed to an appropriate flow handler. The identification of the appropriate flow handler may be similar to that described above.

In step 415, the appropriate flow handler may update the flow dependencies and/or the result context with context data received in the context/feed from CPS. This may be similar to step 315, above.

In step 420, the flow handler may send the next service call to a component if necessary.

Figure 5:
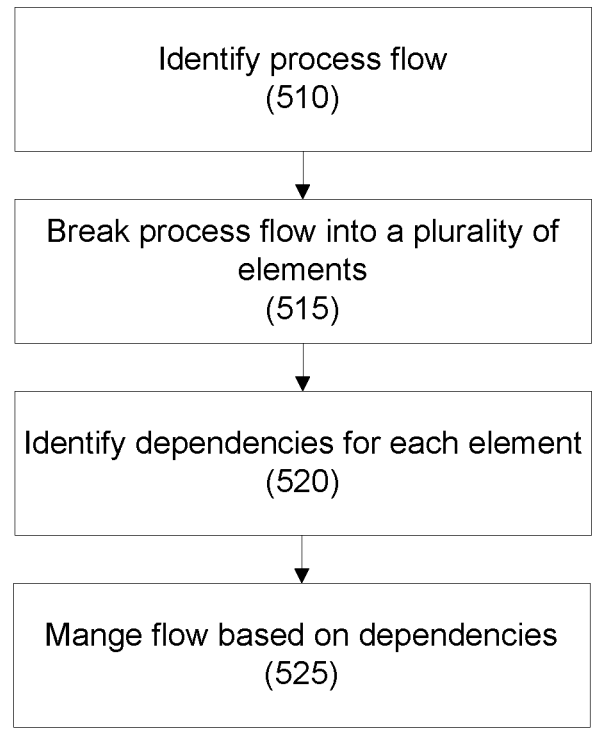
FIG. 5 depicts a method for distributed business process management according to one embodiment.

Referring to FIG. 5, a method for distributed business process management is disclosed according to one embodiment.

In step 510, a process flow for a business process may be identified.

In step 515, the process flow may be broken down in to a plurality of elements. For example, each element may have a defined/specific functionality, such as exposure calculations and exposure aggregations. These two elements have specific functionality, and are independent of each other. There are other factors that "flow developers" look at when splitting into individual elements, such as the processing steps that could be re-run in isolation and also create the results in a consistent state, etc.

In step 520, the dependencies for each element may be identified. In one embodiment, the dependencies may comprise the inputs and the outputs to an element. In another embodiment, the inputs may also comprise the inputs and outputs to sub-elements of an element. For example, data that is external, or outside the element's control, that is needed by the element for processing may be considered to be a dependency. Dependencies may be a file, data, a time, etc.

In step 525, the flow may be managed based on the dependencies.

Figure 6:
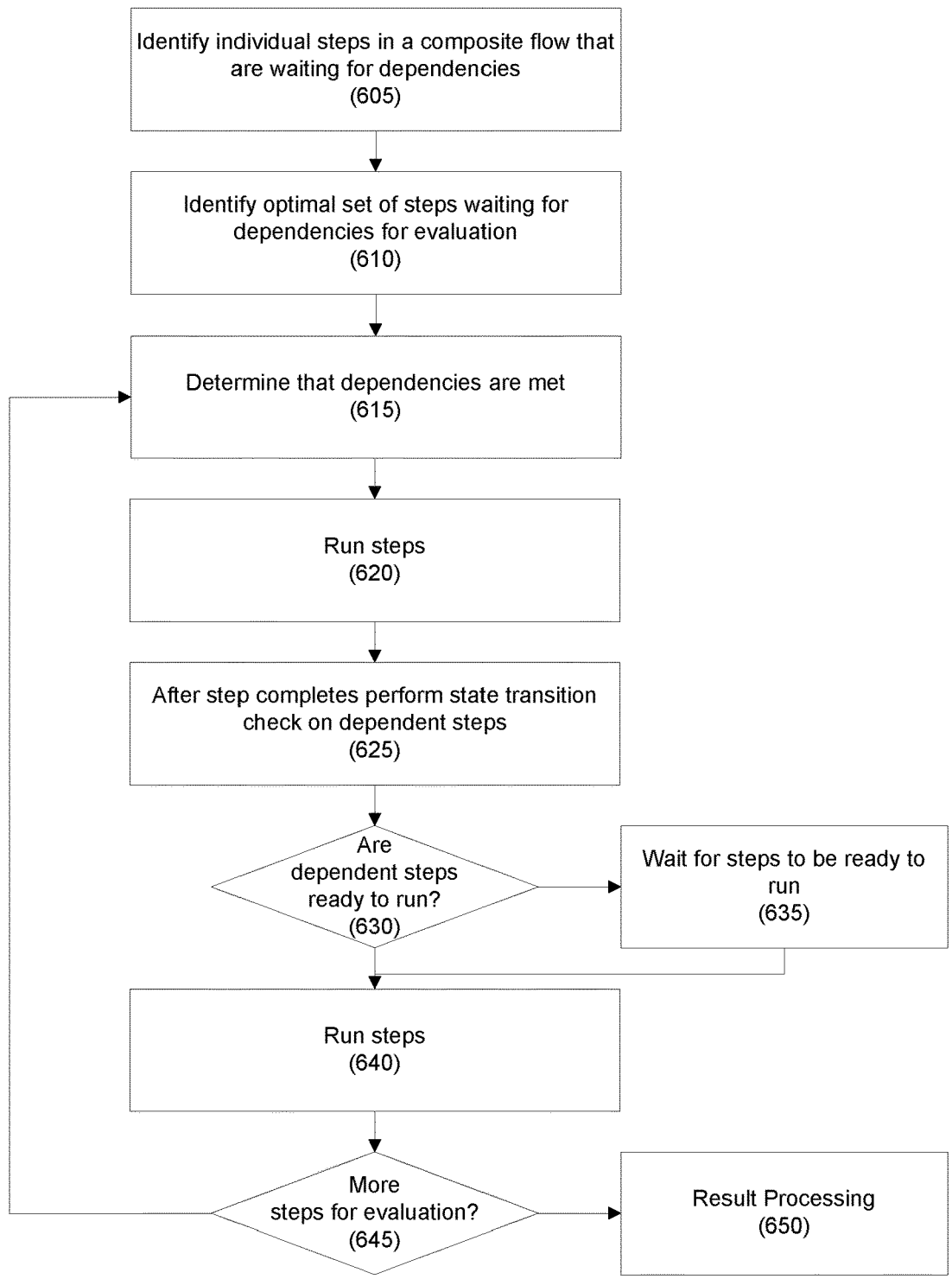
FIG. 6 depicts a method for managing a process flow according to one embodiment.

Referring now to FIG. 6, a method for managing a process flow is provided according to one embodiment.

In step 605, the individual steps, or atomic flows, in a composite flow that are currently waiting for dependencies may be identified.

In step 610, the engine identifies an optimal set of steps to be evaluated. In one embodiment, the optimal set of steps may be a subset of the steps waiting for dependencies identified in step 605.

In one embodiment, even if multiple steps are identified, only one may be evaluated. For example, if step 2 depends on step 1 and both are waiting for dependencies, then the engine may evaluate only step 1. In other embodiments, multiple steps may be evaluated in parallel.

In one embodiment, algorithms may be used to determine the evaluation and run order of the steps.

In step 615, a state transition machine may determine that all the dependencies are met, and in step 620, a step may be run.

In one embodiment, running the step may include, for example, sending messages, REST requests, calling a stored procedure, a java message call, combinations thereof, etc.

In one embodiment, the state for the step being evaluated may be changed to "running."

In step 625, once activity is complete (e.g., once a result is received), steps that are dependent on this step are identified and a state transition check may be performed.

In step 630, if the state transition check determines that the dependent steps are ready to run, in step 640, the steps are run. If they are not ready to run, in step 635, the system waits for the steps to be ready to run.

In step 645, after the dependent steps are complete, if there are additional steps to run, the process continues to step 615. If there are no additional steps, in step 650, results may be processed (e.g., recorded, compared to other steps, etc.).

Figure 7:
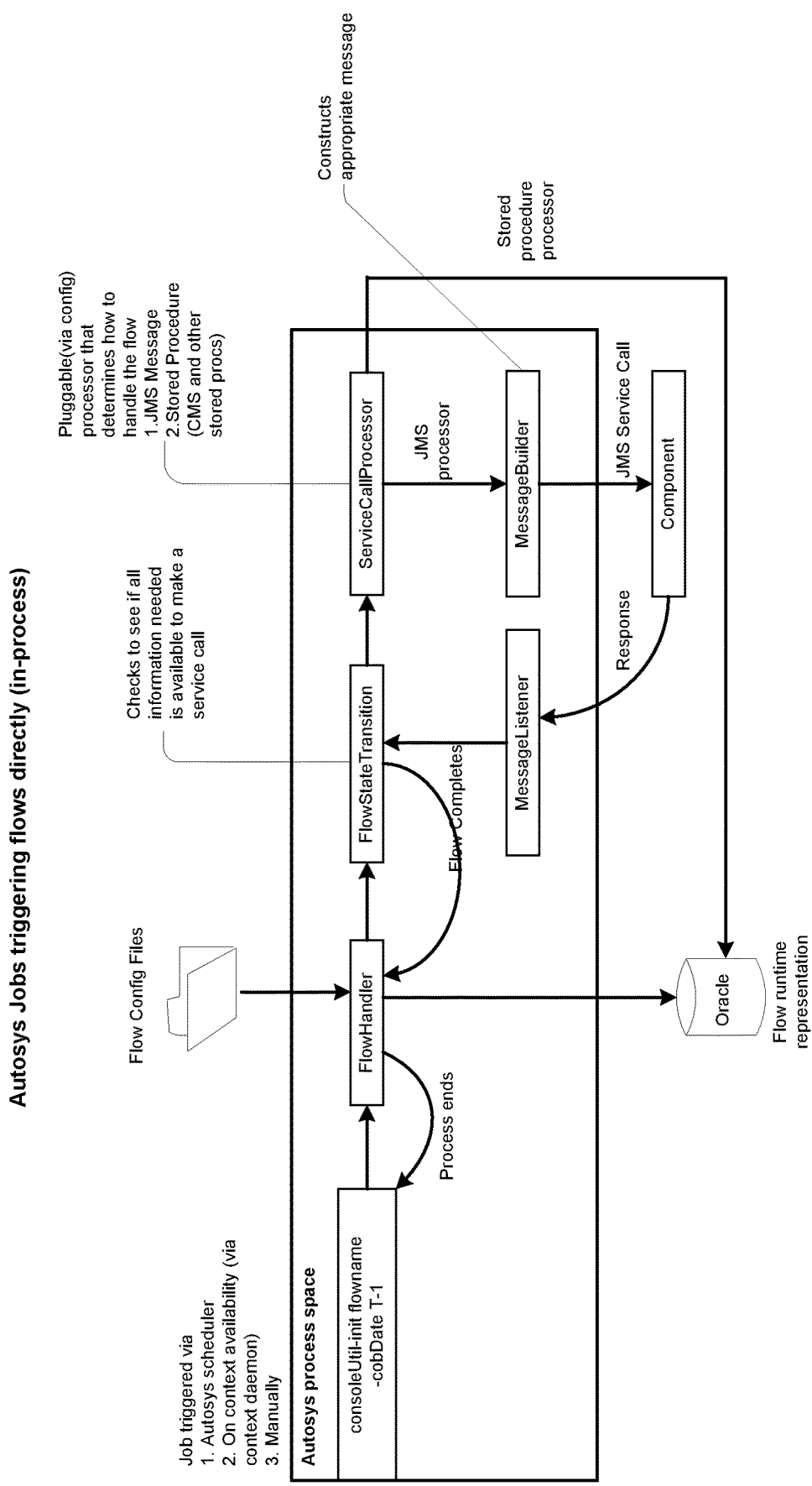
FIG. 7 depicts an exemplary embodiment in which an Autosys job triggers a flow in-process via a process flow management engine according to one embodiment.

FIG. 7 depicts an exemplary embodiment in which an Autosys job triggers a flow inprocess via a process flow management engine according to one embodiment. For example, a job may be triggered by an Autosys scheduler, based on context availability (e.g., via a context daemon), etc. The flow handler receives flow config files, and the flow state transition module checks to see if all information that is needed to make a service call is available. If so, the service call processor, which may be a pluggable processor that may be provided by config, may determine how to handle the flow. For example, it may provide an java message service (JMS) message, a stored procedure (e.g., CMS or other stored procedure), etc. In one embodiment, the message may include information about the input data sets to be processed, and the result data set that needs to be created. It may then provide a runtime representation of the flow.

The service call processor then calls the message builder, which may construct an appropriate message and may make a JMS service call to a component, such as any external application, micro-service, etc. that may perform a specific processing step within the larger business process flow that is being orchestrated. Examples include an exposure calculator, an aggregator, a report generation service, etc.

The component may provide a response, which may be received by a message listener. The message listener then completes the flow.

Figure 8:
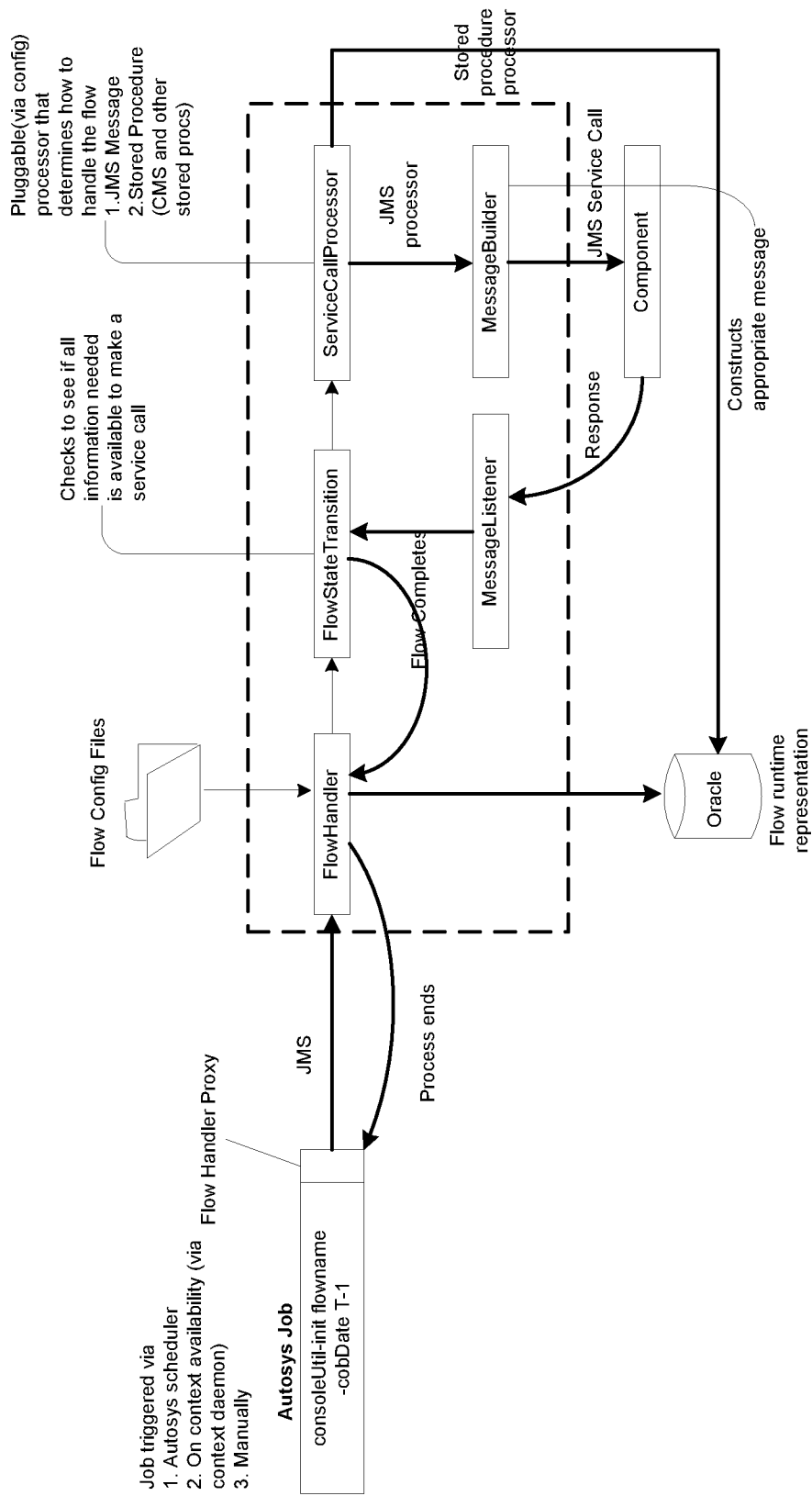
FIG. 8 depicts an exemplary embodiment in which an Autosys job triggers a flow out-of-process in a process flow management engine according to one embodiment.

FIG. 8 depicts an exemplary embodiment in which an Autosys job triggers a flow out-of-process in a process flow management engine. In this embodiment, a shared instance of the software/application processing engine may already be running, and may service multiple business flows at the same time.

For example, a job may be triggered by an Autosys scheduler, based on context availability (e.g., via a context daemon), manually, etc. An Autosys listener may receive a JMS message from Autosys Flow proxy. It may receive the box runid, jobname/flow name, etc.

The context dependency resolver will look up the database for the contexts associated with the flow created for the current runid by the context watcher jobs in autosys.

Common flow configuration may be needed to identify the exact contexts needed.

Message builders may be called to construct the message, consisting of input context dependencies and component specific attributes. The message builders may support different formats (e.g., JSON, XML, etc.) for the messages.

The message may be communicated to the component using a communication adapter. Examples include REST, webservices, JMS, stored procedure call, etc. Any errors or status changes are communicated back to the Autosys job by publishing a message back to a topic.

Figure 9:
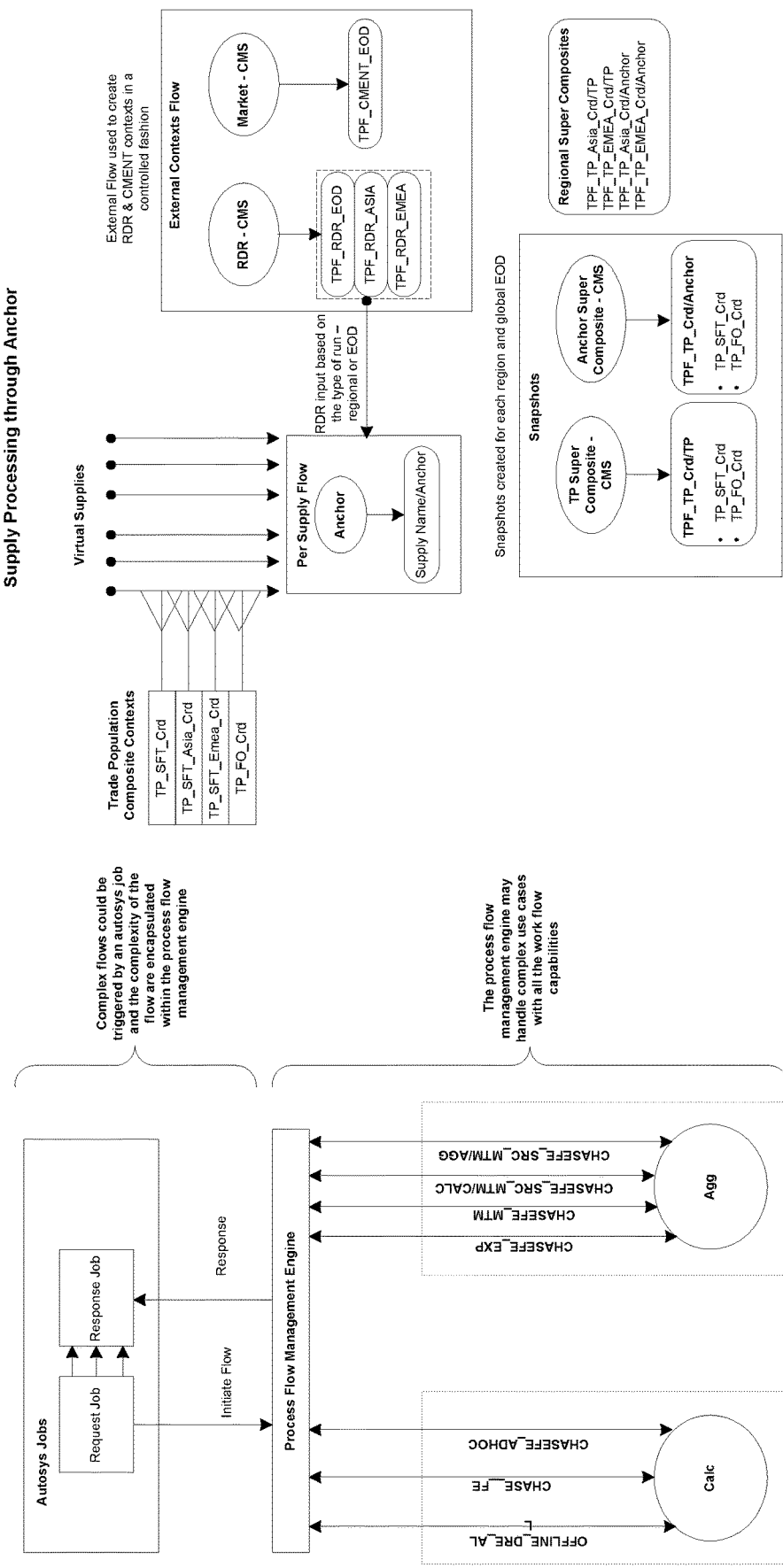
FIG. 9 depicts an exemplary business process flow according to one embodiment.

FIG. 9 depicts an extension of the out-of-process description disclosed in FIG. 8, above, according to an exemplary embodiment. FIG. 10 depicts the process flow management engine handling a finer level of orchestration (more granular orchestration), and hiding those details from the client. The client (in this case, Autosys) handles orchestration at a much coarser level, hence the distributed orchestration. One orchestration step at the Autosys level could be several orchestration steps within the process flow management engine.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for configuration-driven distributed orchestration, comprising:
   receiving, at a flow handler, a request for a runtime flow from a flow management adapter;
   reading, by the flow handler, a flow configuration from the request;
   creating, by the flow handler, an instance of the runtime flow;
   initiating, by the flow handler, a service call to each component of a plurality of components in the runtime flow;
   creating, by the flow handler, a runtime instance in a database along with a state of each dependency in the runtime flow by:
      identifying one or more dependencies for each component of the runtime flow, wherein the one or more dependencies comprise inputs and outputs for a component;
      generating runtime data associated with the runtime flow, wherein the runtime data includes a snapshot event associated with the runtime flow;
      identifying, by a process flow management engine, the components that are waiting for dependencies to clear before the runtime flow can execute;
   identifying, by the process flow management engine, an optimal set of components from the plurality of components, wherein the optimal set of components comprises a subset of the plurality of components;
   determining, by the process flow management engine, a run order for the optimal set of components;
   determining, by the process flow management engine, that the dependencies have cleared; and
   executing, by the process flow management engine, the optimal set of components in the run order by building and sending a message to each component, receiving, by a message listener, a component response message from each component; and updating a result context of the runtime flow based on the component response message from each component.

2. The method of claim 1, wherein a state transition machine in the process flow management engine determines that the dependencies are met.

3. The method of claim 1, wherein executing the optimal set of components comprises sending a message to each component.

4. The method of claim 3, wherein the component comprises a micro service.

5. The method of claim 1, further comprising changing a state for an executing component.

6. The method of claim 1, wherein the optimal set of components are determined by an algorithm.

7. The method of claim 1, wherein executing the optimal set of components comprises sending a REST request to each component.

8. The method of claim 1, wherein executing the optimal set of components comprises calling a stored procedure to execute each component.

9. The method of claim 1, further comprising:
   updating, by the process flow management engine, a state for the component being executed to a running state.

10. The method of claim 1, further comprising:
    executing, by the process flow management engine, a state transition check after the execution of each component is complete.

11. The method of claim 10, wherein the state transition check confirms that components dependent on the completed component are ready for execution.

12. An electronic device, comprising:
    a memory storing a computer program;
    a computer processor; and
    a plurality of components;
    wherein, when executed by the computer processor, the computer program causes the computer processor to perform the following:
    receive a request for a runtime flow from a flow management adapter;
    read a flow configuration from the request;
    create an instance of the runtime flow;

initiate a service call to each component of a plurality of components in the runtime flow;

create a runtime instance in a database along with a state of each dependency in the runtime flow by:

identifying one or more dependencies for each component of the runtime flow, wherein the one or more dependencies comprise inputs and outputs for a component;

generating runtime data associated with the runtime flow, wherein the runtime data includes a snapshot event associated with the runtime flow;

identifying the components that are waiting for dependencies to clear before the runtime flow can execute;

identify an optimal set of components from the plurality of components, wherein the optimal set of components comprises a subset of the plurality of components;

determine a run order for the optimal set of components;

determine that the dependencies have cleared; and execute the optimal set of components in the run order by building and sending a message to each component, receiving, by a message listener, a component response message from each component; and updating a result context of the runtime flow based on the component response message from each component.

13. The electronic device of claim 12, wherein the computer program causes the computer processor to send a message to each component.

14. The electronic device of claim 13, wherein the component comprises a micro service.

15. The electronic device of claim 12, wherein the computer program causes the computer processor to change a state for an executing component.

16. The electronic device of claim 12, wherein the computer program causes the computer processor to send a REST request message to a component to execute the components.

17. The electronic device of claim 12, wherein the computer program causes the computer processor to call a stored procedure to a component to execute the components.

18. The electronic device of claim 12, wherein the computer program causes the computer processor to update a state for the component being executed to a running state.

19. The electronic device of claim 12, wherein the computer program causes the computer processor to execute a state transition check after the execution of each component is complete.

20. The electronic device of claim 19, wherein the state transition check confirms that process steps dependent on the completed component are ready for execution.

* * * * *